US009169570B2

(12) United States Patent
Iltsenko et al.

(10) Patent No.: US 9,169,570 B2
(45) Date of Patent: Oct. 27, 2015

(54) METHOD AND DEVICE FOR DISINFECTANT PRODUCTION

(71) Applicants: Valeri Iltsenko, Tallinn (EE); Nikolay Nayda, Tallinn (EE)

(72) Inventors: Valeri Iltsenko, Tallinn (EE); Nikolay Nayda, Tallinn (EE)

( * ) Notice: Subject to any disclaimer, the term of this patent is extended or adjusted under 35 U.S.C. 154(b) by 0 days.

(21) Appl. No.: 14/305,818

(22) Filed: Jun. 16, 2014

(65) Prior Publication Data

US 2014/0291164 A1    Oct. 2, 2014

Related U.S. Application Data

(62) Division of application No. 13/340,992, filed on Dec. 30, 2011, now abandoned.

(30) Foreign Application Priority Data

Dec. 30, 2010    (EE) .................................. 201000095

(51) Int. Cl.
| | |
|---|---|
| *C25B 1/26* | (2006.01) |
| *C02F 1/461* | (2006.01) |
| *C02F 1/467* | (2006.01) |
| *C25B 1/46* | (2006.01) |
| *C25B 9/08* | (2006.01) |
| *C25B 15/08* | (2006.01) |

(52) U.S. Cl.
CPC . *C25B 1/26* (2013.01); *C02F 1/461* (2013.01); *C02F 1/4674* (2013.01); *C25B 1/46* (2013.01); *C25B 9/08* (2013.01); *C25B 15/08* (2013.01); *C02F 1/4618* (2013.01); *C02F 2001/46171* (2013.01); *C02F 2201/4618* (2013.01); *C02F 2201/46115* (2013.01); *C02F 2201/46145* (2013.01)

(58) Field of Classification Search
CPC .. C02F 1/4618; C02F 1/4674; C02F 1/46104; C02F 2001/46171; C02F 2201/46115; C02F 2201/46185; C25B 1/46; C25B 9/08
See application file for complete search history.

(56) References Cited

U.S. PATENT DOCUMENTS

| | | | | |
|---|---|---|---|---|
| 5,985,110 | A * | 11/1999 | Bakhir et al. | 204/257 |
| 8,568,574 | B2 * | 10/2013 | Iltsenko et al. | 204/260 |
| 2009/0266709 | A1 * | 10/2009 | Iltsenko et al. | 204/260 |

* cited by examiner

*Primary Examiner* — Keith Hendricks
*Assistant Examiner* — Steven A. Friday
(74) *Attorney, Agent, or Firm* — Fishman Stewart Yamaguchi PLLC

(57) ABSTRACT

The present invention relates to a technology for producing the production of disinfectants by diaphragm electrolysis of the aqueous solution of sodium chloride. Disinfectants are used in agriculture, public health care and medical institutions, public water supply systems and elsewhere.

The purpose of the this invention is to provide the means for producing disinfectants with the adjusting range of the pH value from 2.5 to 8.5 by using devices with various capacities ranging from 1 to 600 g active chlorine per hour, while decreasing the consumption of electric energy and sodium chloride for the production of 1 g of active chlorine over two times compared to prototype methods, and reducing the consumption of fresh water for producing of waste catholyte. The purpose of the present invention is accomplished by processing the concentrated aqueous solution of sodium chloride in anode and cathode compartment at a lower flow rate, using the flow of fresh water through the inner space of tubular cathode for cooling the solution.

15 Claims, 1 Drawing Sheet

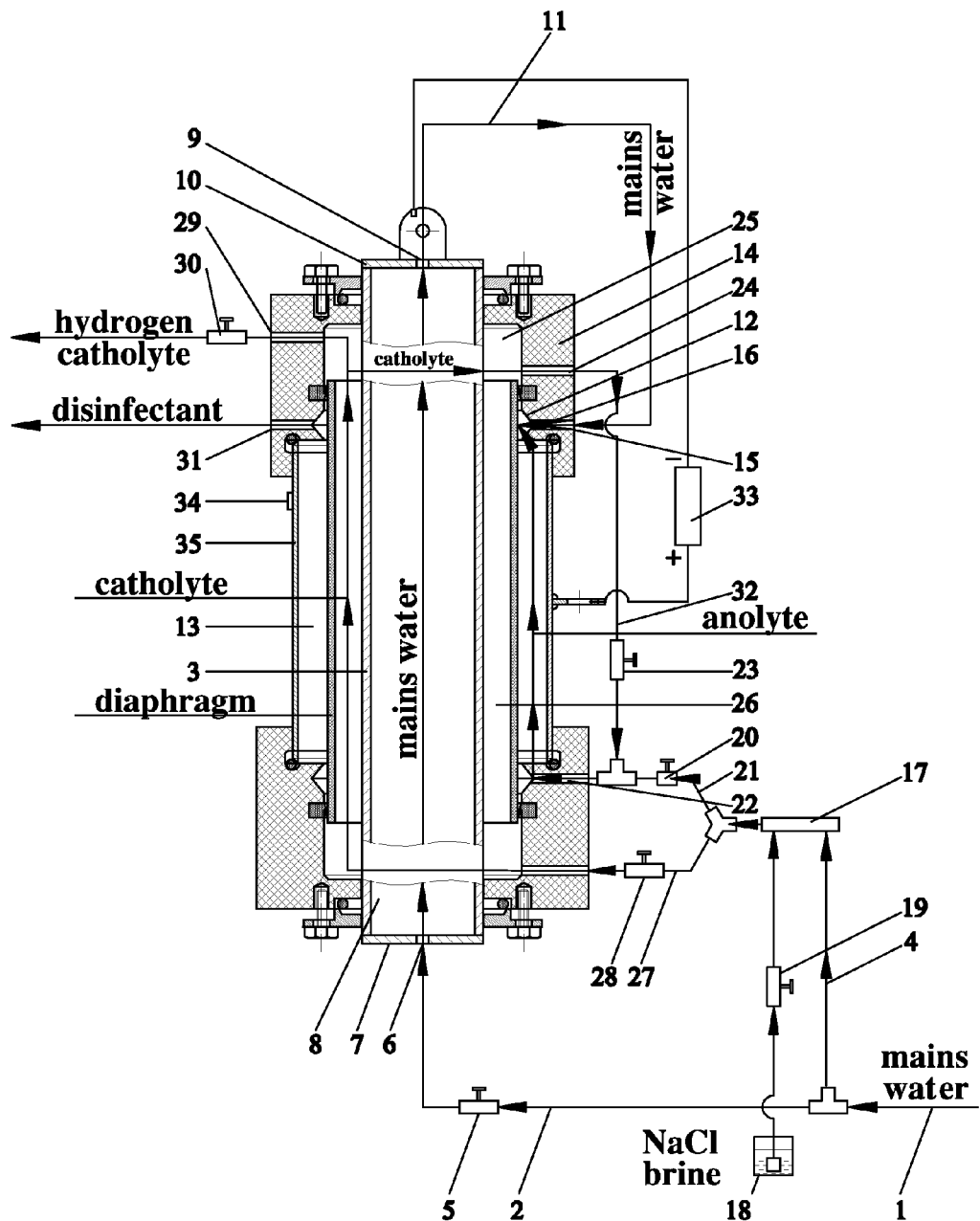

METHOD AND DEVICE FOR DISINFECTANT PRODUCTION

CROSS-REFERENCE TO RELATED APPLICATIONS

This application is a divisional of U.S. patent application Ser. No. 13/340,992, filed Dec. 30, 2011, and claims priority to Estonian Patent Application No. P201000095, filed on Dec. 30, 2010, and the contents of these applications are incorporated herein by reference in their entireties.

TECHNICAL FIELD

The disclosure relates to an electrochemical technology for the production of disinfectants by diaphragm electrolysis.

BACKGROUND

Estonian Patent application No. P201000069 describes a method for the production of disinfectants and an electrolyzer for the execution of the method disclosed therein, in which part of a fresh water flow is used both for cooling a cathode compartment and for the reduction of the concentration of active chlorine in a co-mixer of the electrolyzer. A drawback to this method is that the flow rate passing through the cathode compartment (0.4-0.8% of the disinfectant flow) remains below 2.4 liters per hour (L/h) in devices with a low capacity (up to 300 liters per hour) and it requires the attention of personnel or the use of pressure pumps. Patents RU 2297980 and U.S. Pat. No. 5,985,110 disclose methods using a cylindrical diaphragm electrolyzer and the solution of sodium chloride as an electrolyte. In the method disclosed in RU 2297980, the whole flow of fresh water is mixed with sodium chloride and after mixing, the flow is divided between anode and cathode compartments in a selected ratio, turning the flows into anolyte and catholyte, respectively. Anolyte functions as a disinfectant, while catholytehas often no applications. The pH value of the disinfectant is adjusted in a range from 2.5 to 5.5 by changing the ratio between the flows from the anode and cathode compartments.

In method disclosed in U.S. Pat. No. 5,985,110, the whole flow of fresh water is mixed with sodium chloride; after mixing, the whole flow is guided to a cathode compartment. After flowing out from the cathode compartment and the electrolyzer, some of the catholyte is guided to waste and the rest of the catholyte to the anode compartment. From the anode compartment comes out anolyte, which forms the disinfectant. The pH value of the disinfectant is adjusted in the range from 5.5 to 8.5 of the discharged catholyte, meaning changing the ratio between the flows passing through the anode and cathode compartments. A circumstance that arises from these known methods, and which could be considered a common drawback to methods disclosed in RU 2297980 and U.S. Pat. No. 5,985,110 is that the solution of sodium chloride passing through the anode compartment has a low level of mineralization (up to 8 g/l—a quantity equal with the quantity of the produced disinfectant), resulting in the consumption of over 30 W of electrical energy and 12 g of sodium chloride for the production of 1 g of active chlorine. What is needed is a method to reduce mineralization arises from the aspect that with the equal concentration of active chlorine and pH level, the best disinfectants by their bactericidal and corrosion preventive effect are substances with a lower content of sodium chloride. Reducing the consumption of sodium chloride per 1 g of active chlorine with the known methods disclosed in RU 2297980 and U.S. Pat. No. 5,985,110 would mean the reduction of anode and cathode flows, an increase in the electrical resistance between electrodes, a decrease in current intensity and a shortage of electrical energy for the production of the required quantity of active chlorine. Traditionally, these problems are solved by: increasing the voltage of electrodes, reducing the distance between electrodes and using a thinner membrane, multiple circulation of flows through the electrode compartments together with the use of external cooling equipment, and several consecutive electrolyzers to reduce the flow rate passing through one electrolyzer. The technical solutions for the reduction of the consumption of sodium chloride are described in more detail for example in patents RU 2130786, RU 2248940, RU 2350692, WO 2006098660 and U.S. Pat. No. 5,783,052; however, with all these solutions the electrolyzers, equipment and methods become substantially more complex.

The equipment necessary for the execution of the methods disclosed in RU 2297980 and U.S. Pat. No. 5,985,110 are described for example in patents RU 2079575 and U.S. Pat. No. 5,871,623. The parts of devices RU 2079575 and U.S. Pat. No. 5,871,623 are as follows: a cylindrical diaphragm electrolyzer with coaxially located anode, cathode and membrane; a source of electrical energy, a supply pipe for fresh water, a mixing unit for fresh water and sodium chloride, a supply pipe to feed sodium chloride to electrode compartments in a quantity that equals with the summed amount of produced disinfectant and disposed catholyte; and valves for adjusting the ratio of flows passing through the anode and cathode compartments. In the device disclosed in U.S. Pat. No. 5,871,623 there is also a discharge for catholyte after flowing out from the electrolyzer and before the anode compartment. The drawback to these prior art devices is that each one of these is designed for realizing only one method—either the method disclosed in RU 2297980, which yields a disinfectant with the pH value from 2.5 to 5.5, or the method disclosed in U.S. Pat. No. 5,985,110, which yields a disinfectant with the pH value from 5.5 to 8.5; at this the same consumer may need simultaneously disinfectants with different pH values in case of a different technology, obtained on the basis of the diaphragm electrolysis of sodium chloride. For example, a farmer is recommended to use a disinfectant with the pH value 3.0-3.5 in the pre-sowing treatment of grain seeds, a pH value 7.0-8.5 in disinfecting the milking equipment, a pH value 2.5-3.5 in the production of silage, and a pH value 6.0-7.5 in disinfecting the drinking water of animals for fattening, etc. Thereby, in practical activities, a relatively wide pH range is required. In addition, the design of electrolyzers used in the known methods of RU 2079575 and U.S. Pat. No. 5,871,623 does not allow the reduction of the consumption of sodium chloride without having applied external circulation and cooling circuits or supplementary electrolyzers. An additional drawback to the equipment used to employ these known methods is that external factors have a major impact on the execution of the method: a random increase in supply voltage entails a change in the quality of the disinfectant and failure of the device, switching on the device involves possible current surges and the supply may be automatically switched off, which may not always be noticed by the operator and the device produces to the collection tank, brine instead of the disinfectant.

SUMMARY

A method and a device for the production of a disinfectant with a pH value in the range from 2.5 to 8.5. The disclosed method and device is configured to use a lower consumption of sodium chloride and electrical energy per 1 g of produced active chlorine in comparison with the known methods and devices, and experiences reduced losses of fresh water in connection with the discharge of catholyte for the adjustment of the pH value while maintaining the geometric dimensions of the electrodes and the mutual distances, and increasing the reliability of the execution of the method.

According to one aspect of the disclosure, a method for the production of the disinfectant involves treatment with an aqueous solution of sodium chloride in a diaphragm electrolyzer with an inner tubular cathode, and foresees the following differences. The solution of sodium chloride planned for the treatment in electrode compartments has been prepared of only one part of fresh water, while the other part of fresh water cools a cathode compartment, passing through its hollow inner space and entering an extension of an anode compartment in a co-mixer of the electrolyzer, mixing there with anolyte arriving from the anode compartment and forming a disinfectant with the required concentration of active chlorine. The sodium chloride solution is guided to the anode compartment in an amount of at least 5 liters per hour per square decimeter ($dm^2$) of the anode compartment. The solution guided to the cathode compartment has the quantity of not less than 4 liters per hour.

For the production of a disinfectant, a device is proposed for the execution of the method, comprising following parts: a source of fresh water, a tank of sodium chloride concentrate, a mixing unit for sodium chloride concentrate, adjustment valves for control of the flows in the anode and cathode compartments, an adjustment valve for catholyte discharge, a source of direct current, a cylindrical electrolyzer with a coaxially located anode, cathode and membrane with an opening in a top cover for the discharge of the disinfectant and an opening for the removal of the catholyte together with hydrogen; a converter of electrical energy from external sources, with the characteristic feature of a tubular inner cathode of the electrolyzer together with covers incorporating end openings for the entry and exit of fresh water. In the upper cover of the electrolyzer there is an opening for fresh water to enter into the extension of the anode compartment, fitted with an injector located at the same height with the discharge opening for the disinfectant. In the upper cover there is also a second opening for the discharge of the solution from the cathode compartment, located higher than the catholyte flow directed to the anode compartment, with the characteristic feature of the inlet of the anode compartment connected to pipes supplied with valves and a mixing unit for sodium chloride and fresh water, also with the lower outlet in the upper cover of the extension of the anode compartment. A further characteristic of the device developed for the production of disinfectants is that the assembly contains devices for the prevention of rapid growth in consumed power, prevention of peak loads in the power network during switching on and for protection against overcurrent during operation, and also a thermal switch located on the anode compartment of the electrolyzer.

A feature of the disclosed method is in that sodium chloride solution is guided to the anode and cathode compartments, the concentration of which has been increased by 60% to 150% in comparison to known prior art methods on account of preparing the solution with the part of the fresh water that is used in the process of obtaining the disinfectant. First, the second part of the fresh water is used for cooling the cathode compartment, then again to dilute the anolyte that had obtained a high content of active chlorine in the anode compartment, and for the production of a disinfectant complying with the requirements of the consumer, but not more than 2 g of active chlorine per one liter. The flow rate through the anode compartment is not less than 5 liters per hour per square decimeter of anode. The flow through the cathode compartment is not less than 4 liters per hour. The pH value is adjusted in the range from 2.5 to 8.5 by changing the routes of sodium chloride solution and the ratio of flows from the electrode compartments.

The device disclosed herein that may be used for the production of disinfectants has an electrolyzer with a tubular internal cathode and that is cooled with fresh water that is flowing inside the cathode and is then used for the production of the disinfectant in a co-mixer of the same electrolyzer. The inlet of fresh water to the co-mixer is supplied with an injector. The device includes a pipe with a valve to feed the first part of fresh water to the hollow internal space of the cathode, and a pipe to feed the second part of fresh water to the sodium chloride mixer. In addition, the device for the production of disinfectants includes a hydraulic system to feed the solution of sodium chloride to the anode inlet of the electrolyzer from different sources: one pipe with a valve connects the inlet of the anode with the mixing unit for fresh water and sodium chloride concentrate, and a second pipe with a valve connects the inlet of the anode with the lower outlet of the cathode compartment in the upper cover of the electrolyzer. When the first valve is open, the other is closed; when the first is closed, the other is open.

The device for the production of disinfectant may also be supplied with a thermal switch located on the external surface of the anode, and with a converter of electrical energy supplied from external sources that includes devices for the prevention of rapid growth in consumed power, prevention of peak loads during switching on and for protection against overcurrent during operation.

There is a reason why the method for the production of disinfectant and the characteristic properties of the device for the execution of the method and the achieved technical result are connected—if a solution of sodium chloride guided to the anode compartment is produced only from the fresh water planned for the production of disinfectants, the solution arriving in the anode compartment has the content of sodium chloride of more than 11 g/l, i.e. with a higher concentration of sodium chloride and in a lower quantity in comparison to the prior art devices and methods. A relatively smaller amount of the solution passes through the anode compartment in a significantly longer time, wherefore more electrical power is spent on each gramme of sodium chloride, allowing a higher number of sodium chloride molecules to complete the electrochemical reaction and generating a bigger quantity of hypochlorous acid and other components of active chlorine from the same quantity of sodium chloride. At this, the anolyte evolving from the anode compartment has a high concentration of active chlorine that is reduced to the value corresponding to the needs of the consumer already before the disinfectant is discharged from the electrolyzer, which occurs in the co-mixer, where the anolyte is merged with the part of the fresh water that had been used for the cooling of the cathode. Using a certain amount of fresh water for the cooling of the cathode makes it possible to have a small part of the sodium chloride solution pass through the cathode compartment, obtain the catholyte concentrate with a low temperature at the outlet of the cathode compartment, and to protect the electrolyzer against overheating. If the whole quantity of catholyte is guided to disposal after it has flowed out from the cathode compartment, then the lower flow passing through the cathode compartment reduces the water flow rate. In comparison with the prior art, the water flow rate becomes lower also with the adjustment of the pH value at the discharge of catholyte, since the quantity of the catholyte concentrate discharged to obtain the same change in the pH value is smaller than the quantity of the catholyte. The inventors of the present disclosure have determined through tests that the flow of more than 4 liters per hour passing through the cathode compartment requires practically no attention of personnel and increases the reliability of the process. Based on experiments it was also found that the flow passing through the anode compartment is optimum both from the aspect of the temperature of sodium chloride solution and the feasible use of sodium chloride, starting from the flow rate of 5 liters per hour per square decimeter of the anode surface facing the cathode.

Using only a part of the fresh water to dissolve sodium chloride causes the sodium chloride solution with a higher concentration (more than 11 g/l) to enter the electrode compartments. The presence of sodium chloride solution with a higher concentration reduces the electrical resistance between electrodes, contributing to the achievement of the same current intensity with a lower voltage and saving electrical energy.

The upper outlet of the cathode compartment is intended for discharging hydrogen from the electrolyzer, which reduces the pressure in the mixing unit for fresh water and sodium chloride concentrate, ensures uniform supply of sodium chloride to the electrolyzer and a stable quality for the disinfectant, degasses the inlet flow of the anode and reduces its electrical resistance; the upper outlet is also used for discharging catholyte during the adjustment of the pH and for guiding the catholyte to the external environment.

The adjustment of the pH value of disinfectant from the range of 2.5 to 5.5 to the range of 5.5 to 8.5 and back is conducted by changing the route of flows. To obtain a disinfectant with the pH value in the range of 2.5 to 5.5, the flow is guided in parallel to the anode and cathode compartments after the mixing unit for the sodium chloride concentrate. Adjustment of pH within the named range occurs by changing the ratio of flows passing through the anode and cathode compartments. To obtain a disinfectant with a pH value in the range of 5.5 to 8.5, after the mixing unit for the sodium chloride concentrate the flow is guided first to the cathode compartment, then to degassing in the extension of the cathode compartment, and then to the inlet of the anode compartment via the lower outlet of the cathode compartment through a pipe with an open valve. The partial adjustment of pH in this range is conducted by discharging some of the catholyte together with hydrogen through the upper outlet of the cathode compartment.

Using an injector to enter fresh water to the co-mixer facilitates the movement of the anolyte flow from the anode compartment to the co-mixer and supports the stability of that flow size.

Supplying the converter of electrical energy with devices to avoid the temporary overload of the power network at the moment of switching on the electrolyzer and to prevent possible switching off of the instrument due to the tripping of an automatic fuse, to limit overcurrent and to avoid rapid increase in consumed power (thermal switch on the surface of the anode) increases the reliability of the method in case of changes in external factors.

Thereby the developed method and the device executing the method provide a technical solution, which results in a reduced consumption of sodium chloride, electrical power and fresh water, and in a bigger adjustment range of the pH value in one device, with stability, simplicity and availability.

Both in case of the prior art methods and the developed method, tests were carried out to compare the consumption of electrical energy, sodium chloride and fresh water in the production of disinfectants with the similar pH value and concentration of active chlorine. The methods were compared, using electrolyzers with the anode, cathode, membrane and anode shield of the same material, anode, cathode and membrane with similar dimensions and the same distance between electrodes. With the yield of 40 liters per hour, the surface area of the anode was 1.55 square decimeters ($dm^2$), with the yield of 120 liters per hour it was 3.48 $dm^2$. In the interest of more convenient description, the following working names were used for the methods:

the method of RU 2079575 with a separate inlet to the anode and cathode compartments—(A+K);

the method corresponding to the disclosure, with a pH in the range of 2.5 to 5.5—(A+2K);

the method of U.S. Pat. No. 5,871,623 with the electrolyte flowing consecutively through the cathode and anode compartment—(ANK);

the method corresponding to the disclosure, with a pH in the range of 5.5 to 8.5—(AN2K).

Test results indicate that the method presented in the disclosure is more economical than the existing methods (A+K) and (ANK). Power consumption is reduced by 30-50%, overall consumption of sodium chloride per 1 g of active chlorine is reduced by 40-50%. The discharge of fresh water to the drain in the form of catholyte, necessary for the adjustment of the pH value of the anolyte to the approximately same value, is reduced by 1.5 times, a similar quantity of the discharge in case of the presented method gives again a good result for the efficient pH adjustment. Test results are presented in tables 1 and 2.

The disclosed method makes it possible to manufacture devices for the production of disinfectants with a broad range of pH values and a lower consumption of sodium chloride, fresh water and power in comparison with similar methods; the devices are convenient and simple and suitable for the use by a wide circle of consumers, including agricultural farms, health care and medical institutions and other social care institutions.

BRIEF DESCRIPTION OF THE DRAWINGS

The FIGURE is a plan of a device that corresponds to and exemplary configuration of the disclosure, with arrows marking the flows of fluids participating in the developed method.

DETAILED DESCRIPTION

The possible execution of an exemplary arrangement of a method corresponding to the disclosure is described in the following examples. The method prescribes that before mixing with the anolyte and the sodium chloride concentrate, fresh water flows along the same path when producing a disinfectant both in the pH range of 2.5 to 5.5 (A+2K) and 5.5 to 8.5 (AN2K).

The flow of fresh water 1 entering from external source is divided into two parts: flow 2, which is intended for mixing with the anolyte and cooling of cathode 3, and flow 4, which is intended for mixing with sodium chloride.

Flow 2 is adjusted on the basis of volume with valve 5, and is guided through opening 6 in the cover 7 of cathode 3 to the hollow inner space 8 in the cathode. Fresh water passes through the hollow interior of the cathode 3 and cools it, then flows through opening 9 in the cover 10 of cathode 3 through pipe 11 to the extension 12 of the anode compartment 13, entering the co-mixer 14 through inlet 15 supplied with injector 16.

At the same time, flow 4 passes to a mixing unit 17 of sodium chloride solution, to which the solution of sodium chloride arrives from a tank 18 in a quantity that is adjusted with valve 19.

If the consumer requires a disinfectant with a pH value in the range of 2.5 to 5.5 (A+2K), then valve 20 is opened to pipe 21 that connects inlet 22 with outlet 24 from extension 25 of cathode compartment 26, and the solution of sodium chloride is guided after exiting mixing unit 17 in parallel to anode compartment 13 through pipe 21 and to cathode compartment 26 through pipe 27. Valve 28 on pipe 27 is intended for the adjustment of the catholyte flow in the cathode compartment 26 in a quantity of not less than 4 liters per hour for the purpose of adjusting the pH value of the disinfectant in the range of 2.5 to 5.5. The bigger the flow in the cathode compartment 26 with the same flow in the anode compartment 13, the lower the pH of the disinfectant. Catholyte arrives into extension 25 of cathode compartment 26 and is discharged together with hydrogen in case of a completely open valve 30 through an upper outlet 29 to the external environment. The solution of sodium chloride entering into anode compartment 13 through pipe 21 is turned into anolyte by electrical energy, containing active chlorine in the form of hypochlorous acid, hypochlorite ions, chlorine dioxide, etc. with the approximate concentration of 2 g/l. The anolyte arrives into extension 12 of anode compartment 13 located in co-mixer 14. There the anolyte is merged with fresh water that enters through opening 15, and the concentration of the active chlorine is adjusted according to the norm of the disinfectant. The disinfectant is guided through outlet 31 to the consumer. Injector 16 reduces the hydraulic pressure of the fresh water arriving to the co-mixer 14 to the movement of anolyte in the anode compartment and to other flows that are consecutively hydraulically connected to the anode compartment, including the continuous feeding of the sodium chloride concentrate to mixing unit 17, which is especially important in order to ensure the stability of the process.

If the consumer requires a disinfectant in the pH range of 5.5 to 8.5 (AN2K), then valve 20 is closed while valve 23 is open. The flow of fresh water follows the same route as in case of method (A+2K). The solution of sodium chloride arrives into cathode compartment 26 through pipe 27. The flow rate in pipe 27 is adjusted with valve 28 in a volume that equals with the flow in the anode compartment, i.e. not less than 5 liters per hour per square decimeter ($dm^2$) of anode, which is increased by discharging catholyte in order to adjust the pH value of the disinfectant.

In the cathode compartment, the solution of sodium chloride turns with the impact of electricity into catholyte with a higher content of sodium chloride.

From cathode compartment 26 the catholyte is guided to extension 25 of the cathode compartment, in which hydrogen and some of the catholyte are discharged through upper outlet 29, which is necessary in order to adjust the ratio between the flows in the electrode compartments and together with that also for the adjustment of the pH value of the disinfectant within the range of 5.5 to 8.5. The quantity of discharged catholyte is adjusted with valve 30. The more catholyte is discharged, the lower the pH value. Some of the catholyte arrives into anode compartment 13 through lower outlet 24 along pipe 32 (with completely open valve 23) via inlet 22. In the anode compartment the catholyte with high content of sodium chloride is turned into anolyte via electrical energy, with the approximate concentration of the active chlorine 2 g/l. The anolyte that contains hypochlorous acid, hypochlorite ions, chlorine dioxide, etc. is guided to extension 12 of anode compartment 13 located in co-mixer 14. Similarly to method (A+2K), in the co-mixer the anolyte is merged with fresh water that enters through opening 15, and the concentration of active chlorine is adjusted to the norm of the disinfectant. The disinfectant is discharged to the consumer through outlet 31.

For the execution of the electrochemical processes of the method and for the auxiliary power consumption of the device, the device includes a converter 33 for external power supply, which incorporates a device for limiting rapid increases in consumed power, a protection device for the prevention of peak loads in the power network during switching on and a protection against overcurrent during operation. Such design of converter 33 increases the reliability of the device, protecting it against possible overloads in the supply network in case of the method.

Since generally the consequences of a majority of deviations from the operating modes provided in this method are increases in the temperature of the anolyte and anode, then the device is also equipped with thermal switch 34 installed to anode 35, breaking the supply current to the electrolyzer until the temperature has returned to the safe level.

TABLE 1

| Indicators | Unit | Test numbers ||||||||||||
| | | 1 ||| 2 ||| 3 ||| 4 |||
| | | A + κ | A + 2κ | ±% | A + κ | A + 2κ | ±% | A + κ | A + 2κ | ±% | A + κ | A + 2κ | ±% |
|---|---|---|---|---|---|---|---|---|---|---|---|---|---|
| Disinfectant quantity | L/h | 40 | 40 | | 40 | 40 | | 120 | 120 | | 120 | 120 | |
| Flow rate in cathode compartment | L/h | 20 | 5 | | 12 | 4 | | 40 | 12 | | 20 | 4 | |
| Flow rate in anode compartment | L/h | 40 | 10 | | 40 | 10 | | 120 | 20 | | 120 | 20 | |
| Flow rate inside cathode | L/h | — | 30 | | — | 30 | | — | 100 | | — | 100 | |
| Total flow rate | L/h | 60 | 45 | | 52 | 44 | | 160 | 132 | | 140 | 124 | |
| Content of active chlorine | mg/l | 505 | 500 | | 510 | 510 | | 500 | 500 | | 500 | 500 | |
| Concentration of sodium chloride at anode compartment inlet | g\l | 4.4 | 7.3 | +66 | 4.7 | 8.0 | +70 | 6.3 | 12.5 | +99 | 7.1 | 12 | +69 |
| Consumption of | W | 41.6 | 18.0 | −57 | 41.2 | 17.6 | −57 | 31.0 | 14.3 | −54 | 31.0 | 14.3 | −54 |

TABLE 1-continued

| | | Test numbers | | | | | | | | | | |
|---|---|---|---|---|---|---|---|---|---|---|---|---|
| | | 1 | | | 2 | | | 3 | | | 4 | | |
| Indicators | Unit | A + κ | A + 2κ | ± % | A + κ | A + 2κ | ± % | A + κ | A + 2κ | ± % | A + κ | A + 2κ | ± % |
| electrical energy | | | | | | | | | | | | | |
| Anolyte pH | | 2.6 | 2.7 | | 3.5 | 3.3 | | 2.9 | 2.9 | | 3.65 | 4.5 | |
| Drained catolyte | L/h | 20 | 5 | −75 | 12 | 4 | −66 | 40 | 12 | −70 | 20 | 4 | −75 |
| Sodium chloride consumption | g/g | 13.0 | 5.5 | −58 | 12.0 | 5.5 | −54 | 16.9 | 4.2 | −75 | 16.5 | 4.0 | −76 |

TABLE 2

| | | Test numbers | | | | | | | | | | | |
|---|---|---|---|---|---|---|---|---|---|---|---|---|---|
| | | 5 | | | 6 | | | 7 | | | 8 | | |
| Indicators | Unit | ANK | AN2K | ± % | ANK | AN2K | ± % | ANK | AN2K | ± % | ANK | AN2K | ± % |
| Disinfectant quantity | L/h | 40 | 40 | | 40 | 40 | | 120 | 120 | | 120 | 120 | |
| Flow rate in cathode compartment | L/h | 40 | 10 | | 45 | 15 | | 120 | 20 | | 120 | 36 | |
| Flow rate in anode compartment | L/h | 40 | 10 | | 40 | 10 | | 120 | 20 | | 160 | 20 | |
| Flow rate inside cathode | L/h | — | 30 | | — | 30 | | — | 100 | | — | 100 | |
| Total flow rate | L/h | 40 | 40 | | 45 | 45 | | 120 | 120 | | 160 | 136 | |
| Content of active chlorine | mg/l | 500 | 500 | | 500 | 500 | | 500 | 500 | | 500 | 500 | |
| Concentration of sodium chloride at anode compartment inlet | g\l | 6.7 | 12.4 | +85 | 6.8 | 11.1 | +63 | 8.6 | 21.0 | +144 | 6.8 | 17.2 | +152 |
| Consumption of electrical energy | W | 37.5 | 17.6 | −53 | 37.5 | 18.0 | −52 | 32.5 | 14.7 | −55 | 34.0 | 15.3 | −55 |
| Anolyte pH | | 8.8 | 9.0 | | 8.2 | 7.7 | | 8.4 | 8.8 | | 6.9 | 6.1 | |
| Drained catolyte | L/h | — | — | | 5 | 5 | | — | — | | 40 | 16 | −80 |
| Sodium chloride consumption | g/g | 13.3 | 6.2 | −53 | 15.2 | 8.3 | −45 | 17.2 | 7.0 | −59 | 18.1 | 10.3 | −43 |

The invention claimed is:

1. A method of producing disinfectant using a fresh water flow through an electrolyzer, the electrolyzer having an anode compartment and a cathode compartment, the method comprising:
   preparing sodium chloride using a first portion of the fresh water, and directing the sodium chloride to the anode and cathode compartments;
   directing a second portion of the fresh water inside a hollow inner space of the cathode, and then into a co-mixer of the electrolyzer; and
   mixing the second portion of the fresh water with anolyte arriving to the co-mixer from the anode compartment;
   wherein the disinfectant has a concentration of active chlorine of up to 2 grams/liter (g/L) and a pH value in a range of 2.5 to 8.5.

2. The method according to claim 1, wherein the flow rate of sodium chloride solution passing through the anode compartment is not less than 5 liters per hour per square decimeter ($dm^2$) of an anode surface facing the cathode.

3. The method according to claim 1, wherein the flow rate of sodium chloride solution passing through the cathode compartment is not less than 4 liters per hour.

4. The method according to claim 1, wherein the concentration of sodium chloride in the solution passing through the anode compartment is up to 20 grams per liter (g/L).

5. The method according to claim 1, further comprising removing hydrogen from the cathode compartment before guiding the catholyte to the anode compartment.

6. The method of claim 1, further comprising moving a flow through the anode and cathode compartments in one direction from bottom to top.

7. The method of claim 1, wherein the disinfectant is produced from the sodium chloride arriving to the anode compartment after a sodium chloride concentrate and the first portion of the fresh water are mixed.

8. The method of claim 1, wherein the pH value of the disinfectant is in a range of 2.5 to 5.5, and further comprising changing the pH value of the disinfectant from a range of 2.5 to 5.5 to a range of 5.5 to 8.5.

9. The method of claim 1, wherein the pH value of the disinfectant is in a range of 5.5 to 8.5, and further comprising changing the pH value of the disinfectant from a range of 5.5 to 8.5 to a range of 2.5 to 5.5.

10. The method of claim 1, further comprising changing the pH value of the disinfectant by changing a ratio of a flow rate through the anode compartment to a flow rate through the cathode compartment.

11. The method of claim 1, further comprising changing the pH value of the disinfectant by adjusting a quantity of catholyte being discharged from the cathode compartment.

12. The method of claim 1, wherein mixing the second portion of the fresh water with the anolyte arriving from the anode compartment includes receiving the anolyte from the bottom of the anode compartment.

13. The method of claim 1, further comprising dividing the fresh water flow to create the first and second portions of the fresh water flow.

14. The method of claim 1, wherein the electrolyzer is a cylindrical diaphragm electrolyzer.

15. The method of claim 1, further comprising producing the disinfectant by diaphragm electrolysis.

* * * * *